G. F. HAVENS.
COLLAPSIBLE WHEEL RIM.
APPLICATION FILED JULY 11, 1919.
1,360,947.
Patented Nov. 30, 1920.
2 SHEETS—SHEET 2.
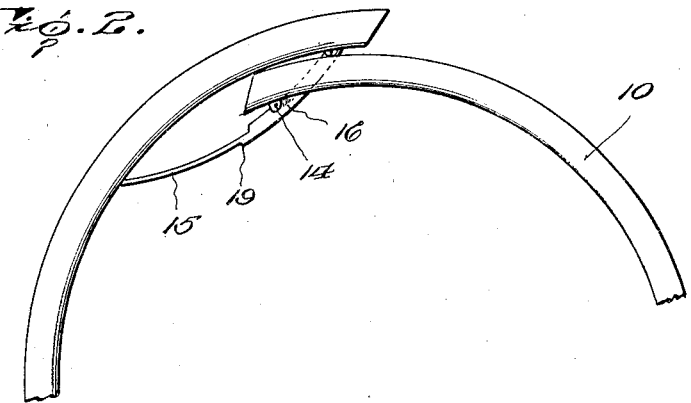
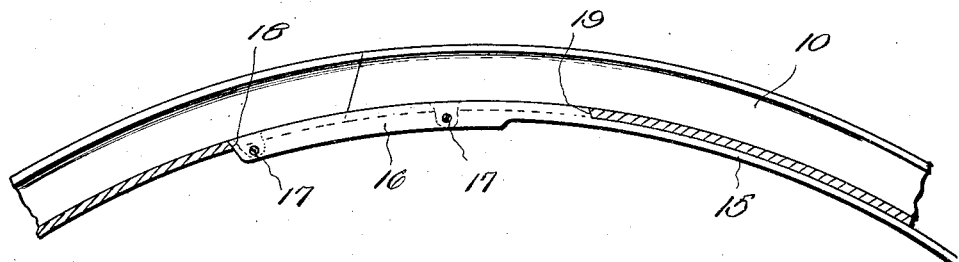
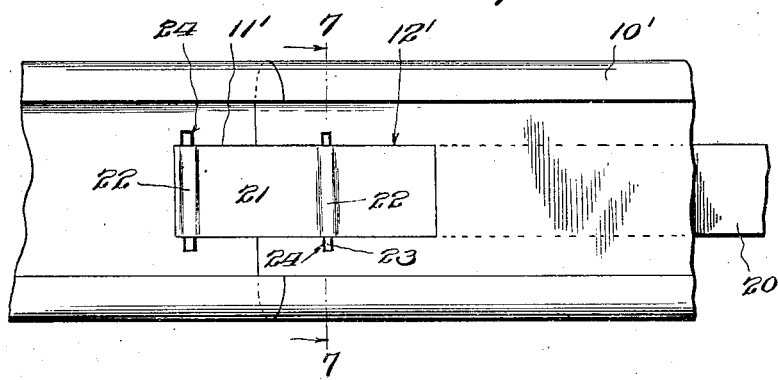
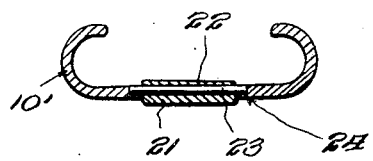
Inventor:
G. F. Havens
by Lacy & Lacy,
Att'ys.

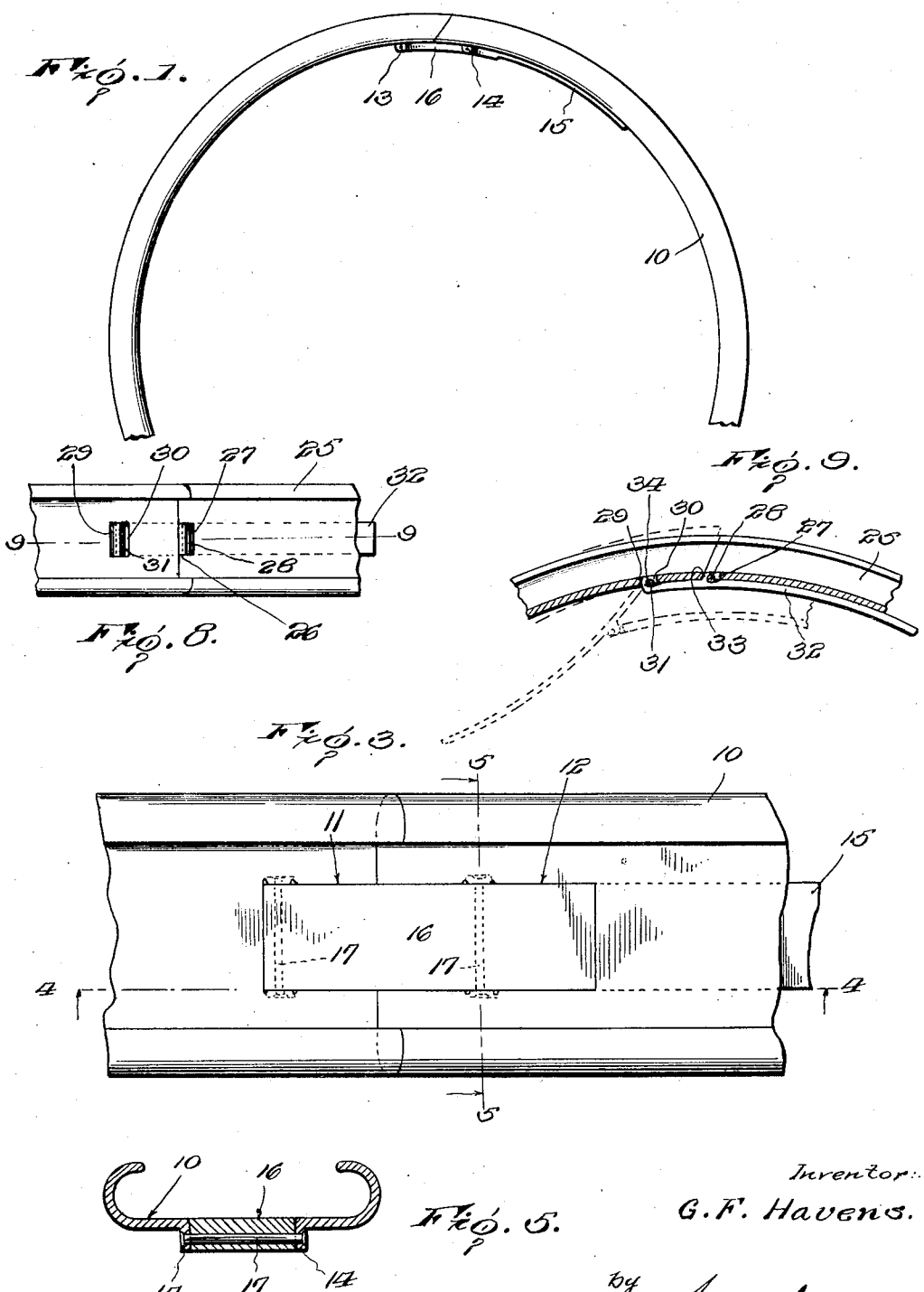

UNITED STATES PATENT OFFICE.

GEORGE F. HAVENS, OF JACKSON, MICHIGAN.

COLLAPSIBLE WHEEL-RIM.

1,360,947.   Specification of Letters Patent.   Patented Nov. 30, 1920.

Application filed July 11, 1919. Serial No. 310,190.

*To all whom it may concern:*

Be it known that I, GEORGE F. HAVENS, citizen of the United States, residing at Jackson, in the county of Jackson and State of Michigan, have invented certain new and useful Improvements in Collapsible Wheel-Rims, of which the following is a specification.

This invention relates to an improved wheel rim for motor vehicles and has as one of its principal objects to provide a construction wherein the rim may be easily and quickly collapsed so that a tire may be removed from or placed upon the rim without difficulty.

The invention has as a further object to provide a rim which, under normal conditions, will effectively support a tire thereon and which, when in position upon a wheel, will be locked against accidental collapse.

And the invention has as a still further object to provide a rim employing a single pivoted connecting lever between the rim ends and wherein said lever will be so formed, that in the normal position of the lever, the pivot pins thereof will be relieved of all thrust.

Other and incidental objects will appear hereinafter.

In the drawings:

Figure 1 is a side elevation showing my improved rim in its normal expanded position, Fig. 2 is a fragmentary elevation showing the rim collapsed, Fig. 3 is a fragmentary plan view looking inwardly upon the outer face of the rim at the joint between the ends thereof, Fig. 4 is a longitudinal sectional view taken through the rim at the joint between the rim ends, Fig. 5 is a transverse sectional view taken on the line 5—5 of Fig. 3, Fig. 6 is a view similar to Fig. 3 but showing a slight modification of the invention, Fig. 7 is a transverse sectional view taken on the line 7—7 of Fig. 6, Fig. 8 is a fragmentary plan view showing a further slight modification of the invention, and Fig. 9 is a fragmentary longitudinal sectional view taken on the line 9—9 of Fig. 8.

In carrying the invention into effect, I employ a split resilient rim body 10. This rim body may be of any approved type as, for instance, a channel rim or a clencher rim, as shown in the drawings, and is formed with mating beveled ends. At one end of the rim the rim base is formed with a medial notch 11 while at the opposite end of the rim the rim base is formed with a similar notch 12 registering with the first notch but somewhat longer. Formed from the rim base at the inner end of the notch 11 are depending oppositely disposed lugs 13 and formed from the rim base at a point substantially midway between the ends of the notch 12 are similar oppositely disposed lugs 14. Joining the ends of the rim is a connecting lever 15, this lever being curved to conform to the curvature of the rim. At its inner end the lever is provided with a thickened head 16 adapted to snugly fit within the notches 11 and 12 and freely engaging through the head and through the pairs of lugs 13 and 14 respectively are pivot pins 17 swingingly connecting the lever with the ends of the rim body. As particularly brought out in Fig. 5 of the drawings, the head is of a thickness to lie flush with the outer face of the rim base so that at the joint between the rim ends a smooth surface will be presented to a tire. Formed on the head at its outer end is a beveled shoulder 18 and, as particularly illustrated in Fig. 4, the inner end wall of the notch 11 is beveled to mate with this shoulder. At its inner end the head is provided with a similar beveled shoulder 19 and, as in the instance of the notch 11, the inner end wall of the notch 12 is beveled to mate with the shoulder 19.

As will now be observed, the lever 15 will normally lie flat against the inner face of the rim base holding the rim ends in register abutting each other and, due to the resiliency of the rim body, the lever will be positively maintained in this position by the spring action of the rim. Thus, the lever 15 cannot be easily swung inwardly, accidentally, so that a secure joint between the rim ends will accordingly be provided. Consequently, under all normal conditions, the rim will effectively support a tire and it is to be observed that when the rim is in position upon a wheel, the presence of the wheel will prevent the inward swinging of the lever 15 so that the lever will thus be locked in its normal position holding the rim ends against separation. In this connection, particular attention is directed to the function of the beveled shoulders 18 and 19 upon the head 16 of the lever. As particularly brought out in Fig. 4, these shoulders will abut the beveled inner end walls of the notches 11 and 12 of the rim base to coöperate with the rim ends for receiving the inward thrust upon the lever set up by the spring action of the rim body. Thus, the lugs 14 and pivot pins 17 will normally be relieved of such thrust so that liability of bending or snapping off of these elements will be reduced to a minimum. Since the head 16 fits snugly within the notches 11 and 12 the head will, of course, lock the rim ends against relative lateral movement. To collapse the rim, it is simply necessary to grasp the free end portion of the lever 15 and swing the lever inwardly. Inward movement of the lever will, as will be seen, serve to shift one end portion of the rim outwardly and the other end portion thereof inwardly so that as the inward movement of the lever progresses, the rim ends will be shifted out of register and, as shown in Fig. 2, into overlapping position. As soon as the lever has reached a position beyond the pivotal center thereof, the spring action of the rim body will, as will be clear, act upon the lever to complete the inward swinging movement thereof so that in order to collapse the rim it is simply necessary to manually shift the lever inwardly to a position slightly beyond such pivotal center when, upon the release of the lever, it will be immediately shifted to engage at its free end with the adjacent end portion of the rim for thus limiting the rim in its collapsing movement. Thus, the rim may be easily and quickly collapsed and when so collapsed it will be seen that a tire may be readily placed upon or removed from the rim. To again expand the rim, the free end portion of the lever 15 is grasped and the lever swung outwardly to a position slightly beyond its pivotal center, when the resiliency of the rim body will again act, upon the release of the lever, to forcibly complete the outward swinging movement of the lever and shift the lever to its normal position firmly holding the rim ends together.

In Figs. 6 and 7 of the drawings I have illustrated a slight modification of the invention. In this modification the rim body is indicated at 10'. As in the preferred construction, the rim base is provided at one end of the rim with a notch 11' and at the opposite end of the rim with a notch 12'. A connecting lever 20 is employed as in the preferred construction and this lever is formed with a thickened head 21 adapted to snugly fit within said notches. Formed on the outer face of the head are raised transverse ribs 22 spaced longitudinally of the head and fitted through these ribs are pivot pins 23 corresponding to the pivot pins 17 of the preferred construction. However, in this modification, the lugs 14 of the preferred construction are eliminated and in lieu thereof the outer face of the rim base is provided with slots 24 in which the end portions of the pivot pins 23 engage, the raised ribs 22 being provided so that the pivot pin will properly support the head normally lying flush at its outer face with the outer face of the rim base. The end portions of the pivot pins 23 are preferably secured within the slots 24 by welding so that the lever will thus be firmly connected with the rim body. However, if preferred, these pins may be secured within the slots in any other approved manner. Otherwise, this modified construction is identical with the preferred form of the invention and further description of the modification is accordingly believed unnecessary.

In Figs. 8 and 9 of the drawings, I have shown a further slight modification of the invention wherein the connecting lever employed between the end portions of the rim is detachably mounted in position so that if found necessary, this lever may be removed. Referring more particularly to these figures, the rim body is indicated at 25. At one end of the rim body, the rim base is, as particularly brought out in Fig. 8, provided with a medial notch 26 and in spaced parallel relation to this notch is further formed with a transverse slot 27 therethrough. A pivot web or pintle 28 is thus defined. Adjacent the opposite end of the rim, the rim base is formed with spaced parallel slots which, for convenience, have been indicated at 29 and 30 respectively, these slots extending transversely of the rim base and being arranged opposite the slot 27. Between the slots 29 and 30 is defined a pivot web or pintle 31. A connecting lever 32 is employed, this lever being curved longitudinally to seat flat against the inner face of the rim body. Adjacent its inner end the lever is formed with a transverse upstanding hook 33 while, at the inner terminal of the lever, a similar hook 34 is provided. As shown, the hook 33 fits within the notch 26 engaging over the pivot web 28 while the hook 34 is received through the notch 29 engaging over the pivot web 31. The lever is thus swingingly connected with the end portions of the rim and, in its normal position abutting at its free end portion with the rim body, will rigidly hold the rim ends in register abutting each other. To collapse the rim the free end of the lever is grasped and swung inwardly. Coincidently, the hook 33 of the lever will ride around the pivot web 28 into the slot 27 while the hook 34 will ride around the pivot web 31 into the slot 30. Thus free inward movement of the lever will be permitted so that the lever will act to draw one end portion of the rim inwardly and shift the other end portion of the rim outwardly so that the rim ends will, as suggested in dotted lines in Fig. 9, be moved into overlapping relation. For again expanding the rim it is simply necessary to swing the lever outwardly to its normal position when the rim ends will be returned to their abutting registering relation.

It is now to be observed that the webs 28 and 31 are pressed inwardly with respect to the rim base a distance sufficient to permit the lever 32 to be bodily moved longitudinally in the direction of its inner end for disengaging the hooks 33 and 34 of the lever from said webs. Thus, should it become necessary, the lever may be readily detached from the rim. To replace the lever, the hooks are, after the rim ends have been brought into registering abutting relation with each other, positioned in front of the pivot webs when by bodily moving the lever longitudinally in the direction of its outer end, the hooks may be again engaged over the webs.

Having thus described the invention, what is claimed as new is:

1. A wheel rim including a split resilient rim body having the base thereof provided at the end portions of the rim with notches one longer than the other, the shorter notch being substantially half the length of the longer, a lever thickened at the inner end portion thereof to provide an integral head normally fitting in said notches, means connecting the free end of the head with one end portion of the rim at the inner end of the shorter notch, and means connecting the intermediate portion of the head with the other end portion of the rim at a point substantially midway between the ends of the longer notch.

2. A wheel rim including a split resilient rim body having the base thereof provided at the end portions of the rim with notches, a lever provided at the inner end portion thereof with a raised integral head fitting in said notches to normally intersect the joint between the rim ends at a point nearer to a second point substantially midway between the ends of the head than to either end thereof, means pivotally connecting the head at one end with one end portion of the rim, and means pivotally connecting the intermediate portion of the head with the other end portion of the rim, the joint between the rim ends normally lying in a plane substantially midway between said pivot points.

3. A wheel rim including a split resilient rim body having the base thereof provided at the end portions of the rim with notches having beveled end walls, a lever thickened at one end portion thereof to provide an integral head fitting in said notches to normally intersect the joint between the rim ends at a point nearer to a second point substantially midway between the ends of the head than to either end thereof, and means pivotally connecting the head with the end portions of the rim, the head being provided at its ends with beveled shoulders to coact with the end walls of said notches for sustaining end thrust upon the lever.

In testimony whereof I affix my signature.

GEORGE F. HAVENS. [L. S.]